United States Patent
Minor et al.

(10) Patent No.: US 11,674,698 B2
(45) Date of Patent: Jun. 13, 2023

(54) CHILLED BEAM INSTALLATION SYSTEM AND METHOD

(71) Applicant: Air Distribution Technologies IP, LLC, Milwaukee, WI (US)

(72) Inventors: Gary A. Minor, Flower Mound, TX (US); Matthew B. McLaurin, Plano, TX (US)

(73) Assignee: AIR DISTRIBUTION TECHNOLOGIES IP, LLC, Milwaukee, WI (US)

( * ) Notice: Subject to any disclaimer, the term of this patent is extended or adjusted under 35 U.S.C. 154(b) by 333 days.

(21) Appl. No.: 16/410,847

(22) Filed: May 13, 2019

(65) Prior Publication Data
US 2020/0340690 A1    Oct. 29, 2020

Related U.S. Application Data

(60) Provisional application No. 62/837,414, filed on Apr. 23, 2019.

(51) Int. Cl.
| | |
|---|---|
| *F24F 3/06* | (2006.01) |
| *F24F 13/32* | (2006.01) |
| *F24F 13/02* | (2006.01) |
| *F16L 3/08* | (2006.01) |
| *F16L 59/12* | (2006.01) |

(52) U.S. Cl.
CPC .................. *F24F 3/06* (2013.01); *F16L 3/08* (2013.01); *F16L 59/121* (2013.01); *F24F 3/065* (2013.01); *F24F 13/0254* (2013.01); *F24F 13/32* (2013.01)

(58) Field of Classification Search
CPC ...... F28F 1/0007; F28F 1/0047; F28F 1/0317; F28F 1/02; F24F 3/06; F24F 13/0254; F24F 13/32; F24F 13/0227; F24F 13/20; F24F 1/00; F16B 5/0266; F16B 5/0048; F16B 2005/0671; F16B 45/00; F16B 45/015; E04B 9/02; E04B 9/247; E04B 9/241; E04B 9/006; E04B 9/003; E04B 9/008;
(Continued)

(56) References Cited

U.S. PATENT DOCUMENTS

| | | | | |
|---|---|---|---|---|
| 2,971,666 | A | * | 2/1961 | Randall .................. H02G 3/123 220/3.6 |
| 2,973,177 | A | * | 2/1961 | Stubbs .................... F21V 21/04 220/3.6 |

(Continued)

FOREIGN PATENT DOCUMENTS

| | | |
|---|---|---|
| CN | 203131984 U | 8/2013 |
| CN | 203132071 U | 8/2013 |

(Continued)

*Primary Examiner* — Jianying C Atkisson
*Assistant Examiner* — For K Ling
(74) *Attorney, Agent, or Firm* — Fletcher Yoder, PC (57) ABSTRACT

A chilled beam includes a body having a first side and a second side opposite to the first side. The chilled beam also includes a first mounting bracket coupled to the first side and configured to rotate against a first bias of the first mounting bracket in response to a first force against the first mounting bracket. The chilled beam also includes a second mounting bracket coupled to the second side and configured to rotate against a second bias of the second mounting bracket in response to a second force against the second mounting bracket.

22 Claims, 8 Drawing Sheets

(58) Field of Classification Search
CPC ...... E04B 9/005; F16M 13/02; F16M 13/027; F21S 8/026; F21V 21/04
See application file for complete search history.

(56) References Cited

U.S. PATENT DOCUMENTS

| | | | | |
|---|---|---|---|---|
| 3,536,287 | A | * | 10/1970 | Hyman .................... F16B 45/00 248/301 |
| 3,720,432 | A | * | 3/1973 | Chudler .................. E04B 9/003 362/365 |
| 4,449,166 | A | * | 5/1984 | Sharp .................. F21V 33/0088 362/149 |
| 5,077,650 | A | * | 12/1991 | Cestari .................... F21V 21/04 362/147 |
| 5,442,887 | A | * | 8/1995 | Welsh .................... E04B 7/045 52/93.2 |
| 5,516,068 | A | * | 5/1996 | Rice ........................ E04B 9/006 248/300 |
| 6,199,811 | B1 | | 3/2001 | Fargo |
| 7,731,130 | B2 | * | 6/2010 | Decanio ................ H04R 1/2873 248/27.3 |
| 8,453,790 | B1 | * | 6/2013 | Oliver .................... F24F 1/0007 181/224 |
| 10,735,840 | B2 | * | 8/2020 | Santoro .................. H02G 3/281 |

FOREIGN PATENT DOCUMENTS

| | | | | | |
|---|---|---|---|---|---|
| ES | 2142229 | B1 | * | 11/2000 | |
| GB | 2561581 | A | * | 10/2018 | ............. F24F 13/14 |
| JP | 59046429 | A | * | 3/1984 | ............. F24F 13/32 |
| JP | 59183226 | A | * | 10/1984 | ............. F24F 13/32 |
| JP | 59183227 | A | * | 10/1984 | ............. F24F 13/32 |
| JP | 2001133034 | A | * | 5/2001 | |
| KR | 200155987 | Y1 | | 9/1999 | |

* cited by examiner

CHILLED BEAM INSTALLATION SYSTEM AND METHOD

CROSS REFERENCE TO RELATED APPLICATION

This application claims priority from and the benefit of U.S. Provisional Application Ser. No. 62/837,414, entitled "CHILLED BEAM INSTALLATION SYSTEM AND METHOD," filed Apr. 23, 2019, which is hereby incorporated by reference in its entirety for all purposes.

BACKGROUND

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

A wide range of applications exist for HVAC systems. For example, residential, light commercial, commercial, and industrial systems are used to control temperatures and air quality in residences and buildings. Such systems may be dedicated to either heating or cooling, although systems are common that perform both of these functions. Generally, HVAC systems operate by implementing a thermal cycle in which fluids are heated and cooled to provide the desired temperature of an air flow to a controlled space, typically the inside of a residence or building. In certain HVAC systems, a fluid may be cooled by a chiller or heated by a boiler, and the temperature-controlled fluid may be routed to terminal units, such as chilled beams, configured to cool or heat an air flow. In some embodiments, the terminal units may additionally or alternatively receive a ducted primary air, which is mixed with the return air and output to the conditioned space. The terminal units may be installed in, or adjacent to, a ceiling of the building or residence. In traditional embodiments, the terminal units may be heavy, bulky, cumbersome, and/or difficult to install.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates to a chilled beam. The chilled beam includes a body having a first side and a second side opposite to the first side. The chilled beam also includes a first mounting bracket coupled to the first side and configured to rotate against a first bias of the first mounting bracket in response to a first force against the first mounting bracket. The chilled beam also includes a second mounting bracket coupled to the second side and configured to rotate against a second bias of the second mounting bracket in response to a second force against the second mounting bracket The present disclosure also relates to a heating, ventilation, and/or air conditioning (HVAC) system. The HVAC system includes a first mounting strut and a second mounting strut. The HVAC system also includes a chilled beam having a first rotatable mounting bracket disposed on a first side of the chilled beam and configured to sit on the first mounting strut in a deployed position. The chilled beam also includes a second rotatable mounting bracket disposed on a second side of the chilled beam opposite to the first side and configured to sit on the second mounting strut in the deployed position. Each of the first and second rotatable mounting brackets is biased to the deployed position The present disclosure also relates to a chilled beam installation assembly. The chilled beam installation assembly includes a mounting strut and a rotatable mounting bracket coupled to a chilled beam side wall. The rotatable mounting bracket includes a hinge configured to enable rotation of the rotatable mounting bracket relative to the chilled beam side wall between a retracted position in which the rotatable mounting bracket is not configured to sit on the mounting strut and a deployed position in which the rotatable mounting bracket is configured to sit on the mounting strut.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure relates generally to a heating, ventilation, and/or air conditioning (HVAC) system. More particularly, the present disclosure is directed toward chilled beams. In accordance with the present disclosure, a chilled beam installation system includes mounting struts hung or suspended from a mounting wall, such as a ceiling or roof, via rods, and rotatable mounting brackets extending from sides of a chilled beam. For example, the rods may be threaded rods, and may include proximal ends coupled to anchors, such as threaded nuts, disposed in the mounting wall. Distal ends of the threaded rods are disposed opposite to the proximal ends, and may extend into, or adjacent to, a conditioned space. The mounting struts may be coupled to the distal ends of the threaded rods such that the mounting struts are suspended from the mounting wall. For example, a first mounting strut may engage two threaded rods and a second mounting strut may engage two other threaded rods, such that the first mounting strut and the second mounting strut are suspended parallel to one another.

The chilled beam is configured to be mounted on the mounting struts. For example, the chilled beam may include mounting brackets disposed on opposing sides of a body of the chilled beam, such as a plenum body of the chilled beam, and the mounting brackets may be configured to couple to the first and second mounting struts. That is, the mounting brackets of the chilled beam may engage the mounting struts such that the chilled beam is disposed between the first and second mounting struts.

The mounting brackets disposed on opposing sides of the chilled beam may be rotatable. For example, the mounting brackets may be folded or forced downwardly against the sides of the chilled beam, enabling the mounting brackets to pass through a space between the first and second mounting struts as the chilled beam is lifted upwardly toward, and at least partially between, the mounting struts. In some embodiments, the mounting brackets may be folded or forced downwardly by the mounting struts as the chilled beam is lifted upwardly between the mounting struts. That is, the mounting struts may contact upper surfaces of the mounting brackets as the plenum body is lifted between the mounting struts, causing the mounting brackets to rotate downwardly against the opposing sides of the plenum body.

Once the chilled beam is lifted upwardly a sufficient distance, the mounting brackets may clear the mounting struts, causing the mounting brackets to rotate upwardly away from the sides of the chilled beam and into a deployed position, such that the mounting brackets extend outwardly from the chilled beam. The chilled beam may then be lowered back toward the mounting struts, such that the mounting brackets engage the mounting struts.

In some embodiments, the mounting brackets may be spring-loaded to enable the above-described deployed position. For example, the mounting brackets may each include a hinge with a spring disposed thereabout and configured to exert a spring-force against the mounting bracket. The spring force may generally cause the corresponding mounting bracket to rest in the deployed position, and may work against the force exerted by the mounting struts on the mounting brackets as the chilled beam is lifted into the space between the mounting struts. After the mounting brackets clear the mounting struts as the chilled beam is lifted upwardly, the spring force of each mounting bracket may cause the mounting bracket to snap back, or extend or rotate outwardly from the side of the chilled beam, into the above-described deployed position. The chilled beam may then be lowered such that the mounting brackets, while in the deployed state, rest against the mounting struts, thereby suspending the chilled beam near a ceiling of the conditioned space. In certain embodiments, for example in embodiments having spring-loaded mounting brackets, a cross-bracket may extend between, and engage, the first and second mounting struts prior to lifting the chilled beam toward and between the mounting struts. The cross-bracket may be configured to stabilize the mounting struts against the force of the spring-loaded mounting brackets against the mounting struts. That is, the cross-bracket may maintain a distance between the mounting struts during the above-described installation process.

The disclosed chilled beam installation system and method reduces complicated and cumbersome installation components and techniques associated with traditional embodiments, thereby reducing installation costs, improving installation safety, and improving ease of installation. These and other features will be described in detail below with reference to the drawings.

Figure 1:
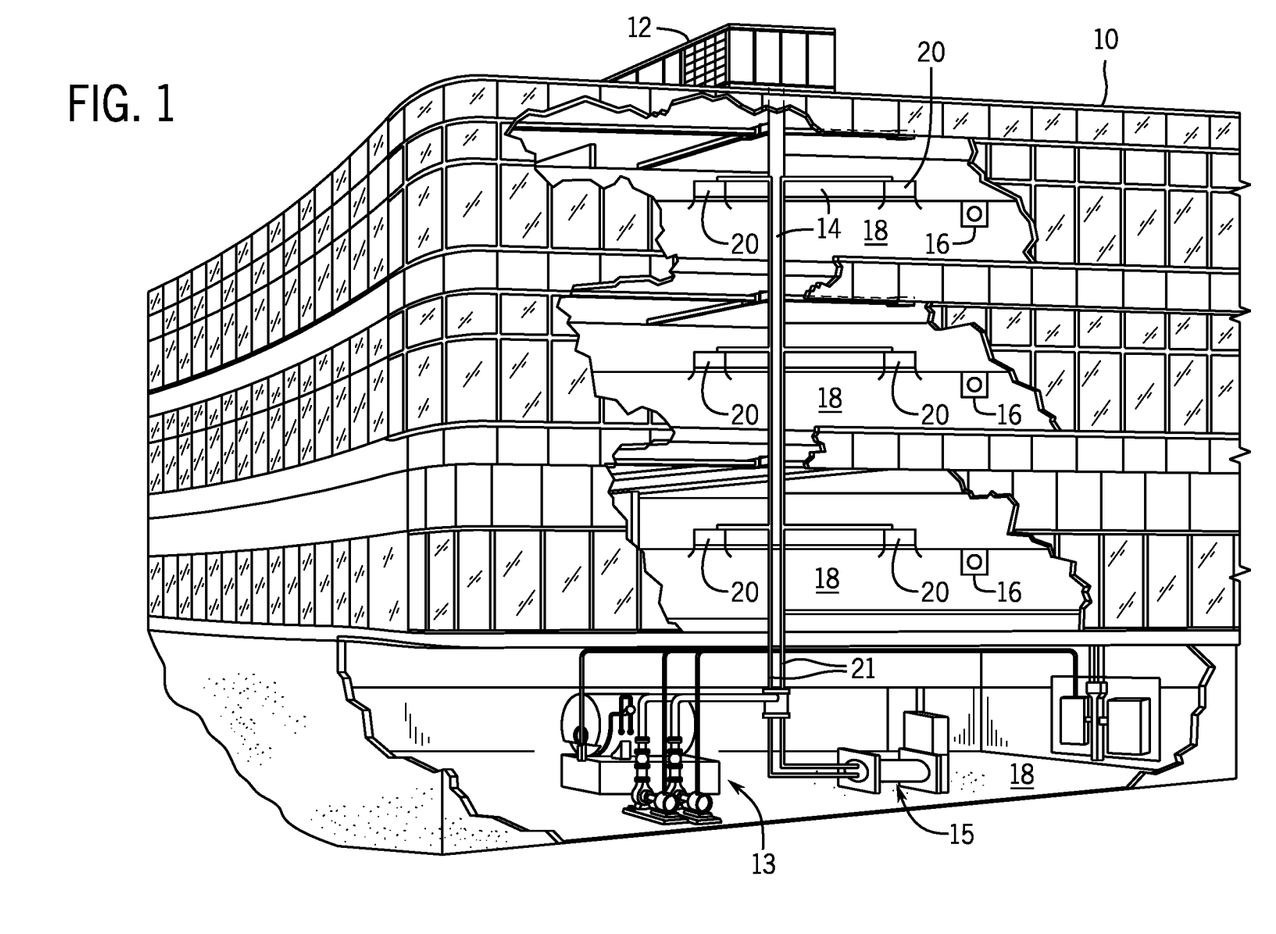
FIG. 1 is a perspective view a heating, ventilation, and/or air conditioning (HVAC) system for building environmental management, in accordance with an aspect of the present disclosure.

Turning now to the drawings, FIG. 1 illustrates an embodiment of a heating, ventilation, and/or air conditioning (HVAC) system for environmental management that may employ one or more HVAC units. As used herein, an HVAC system includes any number of components configured to enable regulation of parameters related to climate characteristics, such as temperature, humidity, air flow, pressure, air quality, and so forth. For example, an HVAC system as used herein is defined as conventionally understood and as further described herein. Components or parts of an HVAC system may include, but are not limited to, all, some of, or individual parts such as a heat exchanger, a heater, an air flow control device, such as a fan, a sensor configured to detect a climate characteristic or operating parameter, a filter, a control device configured to regulate operation of an HVAC system component, a component configured to enable regulation of climate characteristics, or a combination thereof. An HVAC system is a system configured to provide such functions as heating, cooling, ventilation, dehumidification, pressurization, refrigeration, filtration, or any combination thereof. The embodiments described herein may be utilized in a variety of applications to control climate characteristics, such as residential, commercial, industrial, transportation, or other applications where climate control is desired.

In the illustrated embodiment, a building 10 is air conditioned by a system that includes an HVAC unit 12, a boiler 13, and/or a chiller 15. The building 10 may be a commercial structure or a residential structure. As shown, the HVAC unit 12 is disposed on the roof of the building 10. However, the HVAC unit 12 may be located in other equipment rooms or areas adjacent the building 10. The HVAC unit 12 may be a single packaged unit containing other equipment, such as a blower, heat exchangers, integrated air handler, and/or auxiliary heating unit. In other embodiments, the HVAC unit 12 may be part of a split HVAC system, which includes an outdoor HVAC portion and an indoor HVAC portion.

The HVAC unit 12 may be an air cooled device that implements a refrigeration cycle to provide conditioned air to the building 10. Specifically, the HVAC unit 12 may include one or more heat exchangers across which an air flow is passed to condition the air flow before the primary air flow is supplied to the building. In the illustrated embodiment, the HVAC unit 12 is a rooftop unit (RTU) that conditions a primary or supply air stream, such as environmental air and/or a return air flow drawn from the building 10. After the HVAC unit 12 conditions the air flow, the air flow, also referred to herein as a primary air flow, is supplied to the building 10 via ductwork 14 extending throughout the building 10 from the HVAC unit 12. For example, the ductwork 14 may extend to various individual floors or other sections of the building 10, and may route the conditioned air to terminal units 20, such as chilled beams. The terminal units 20 may distribute the ducted air, and in some embodiments a mixed air volume having the ducted air and a recycled or return air, to conditioned spaces 18 of the building 10.

In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air flow and a furnace for heating the air flow. The air flow supplied to the building 10 by the HVAC unit 12 via the ductwork 14 may include environmental air, such as air from outside the building 10, and/or recirculated air from within the building 10, which may or may not be actively and/or passively heated or cooled by the HVAC unit 12 or by other HVAC components. For example, the HVAC unit 12 may operate in a recirculating or economizer mode, such that the supply air flow, and thus the primary air flow, is not actively heated or cooled.

As described above, the terminal units 20 may be utilized to distribute the ducted air to the conditioned space 18. In the illustrated embodiment, the terminal units 20 may also receive recycled or return air from the conditioned space 18, and may condition the return air at the terminal unit 20. For example, the terminal unit 20 may be a chilled beam configured to receive a chilled or heated liquid, such as water, and to utilize the chilled or heated liquid to condition the return air. Specifically, the HVAC system may include the boiler 13, the chiller 15, or both, as described above. The boiler 13 may be configured to heat a liquid, such as water, and the chiller 15 may be configured to cool a liquid, such as water. The chiller 15 may utilize a vapor compression system to cool the water. The boiler 13 may be an electric, oil, or gas powered boiler. The temperature-controlled liquid from the chiller 15 and/or the boiler 13 may be routed via pipes 21 to, and from, the terminal units 20, and may be guided through water coils of the terminal units 20, where the return air from within the conditioned space 18 of the building 10 is passed over the water coils and mixed with the ducted primary air received from the HVAC unit 12 via the ductwork 14. In other embodiments, the water coils and temperature-controlled liquid may be used to directly condition the primary air received from the ductwork 14.

A control device 16, one type of which may be a thermostat, may be used to designate a desired temperature of the conditioned space 18 within the building 10. The control device 16 also may be used to control the flow of air, such as volume, through the ductwork 14 to different areas within the conditioned space 18. For example, the control device 16 may be used to regulate operation of one or more components of the HVAC unit 12 or other components, such as dampers, fans, and/or terminal units 20 within the building 10 that may control the flow of air through and/or from the ductwork 14. In some embodiments, other devices may be included in the system, such as pressure and/or temperature transducers or switches that sense the temperatures and pressures of the conditioned air, return air, and so forth. Moreover, the control device 16 may include computer systems that are integrated with or separate from other building control or monitoring systems, including systems that are remote from the building 10.

It should be appreciated that any of the features described herein may be incorporated with the HVAC unit 12, the boiler 13, the chiller 15, residential heating and cooling systems, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

For example, presently disclosed aspects relating to a chilled beam installation system are included in the embodiment illustrated in FIG. 1, and may be included in other HVAC system embodiments. In accordance with the present disclosure, the terminal units 20, or chilled beams, in FIG. 1 may be suspended from a mounting wall, such as a ceiling or roof of the building 10, by mounting the terminal units 20 to mounting struts hanging from the mounting wall. The terminal units 20, or chilled beams, may include rotatable mounting brackets, such as spring-loaded mounting brackets, that improve ease of installation, installation costs, installation safety, and the like. Presently disclosed installation components and techniques are described in detail below with reference to FIGS. 2-13.

Figure 2:
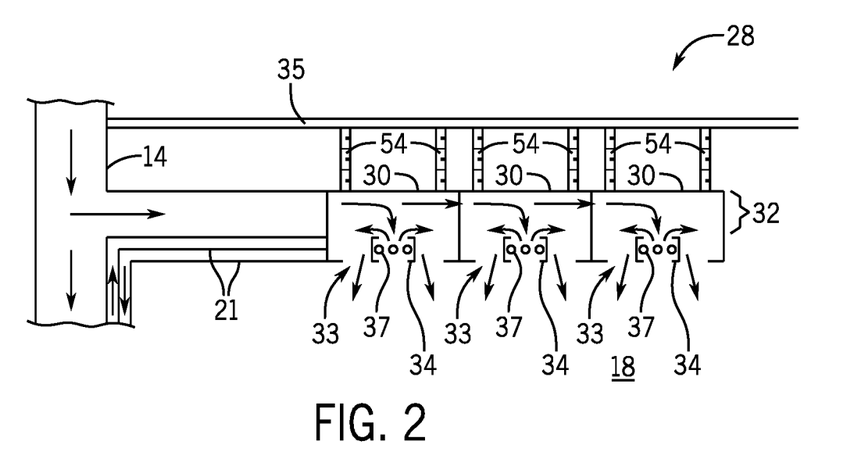
FIG. 2 is a schematic illustration of a portion of the HVAC system of FIG. 1, including chilled beams, in accordance with an aspect of the present disclosure.

FIG. 2 is a schematic illustration of an embodiment of an HVAC system 28 having chilled beams 30. As shown, the HVAC system 28 includes ductwork 14 configured to route temperature-controlled primary air to the chilled beams 30, and piping 21 configured to route temperature-controlled liquid to and from the chilled beams 30. The chilled beams 30 in the illustrated embodiment include plenums 32 connected together to receive the primary air therethrough. The plenums 32 may be configured to route the primary air toward outlets 33 of the chilled beams 30. The chilled beams 30 also include return air units 34 configured to receive return air from the space 18 conditioned by the HVAC system 28. The return air units 34 are also configured to receive the temperature-controlled liquid from the piping 21, for example within coils 37 of the return air units 34, and the temperature-controlled liquid is configured to cool (or heat) the return air drawn into the return air units 34. The cooled (or heated) return air may be mixed with the primary air to form a mixed air volume which is output through the chilled beam outlets 33. It should be noted that, in other chilled beam embodiments in accordance with the present disclosure, the chilled beam 30 may receive an unconditioned or underconditioned primary air from the ductwork 14, and may utilize the temperature-controlled liquid from the piping 21 to cool (or heat) the primary air, with or without recycling return air.

As shown, the chilled beams 30 may be suspended from a mounting wall 35, which may be a ceiling or a roof of a building. For example, rods 54 extending downwardly from the mounting wall 35 may include mounting struts mounted thereto, and the chilled beams 30 may couple to the mounting struts. For example, rotatable mounting brackets disposed on the chilled beams 30 may couple to the mounting struts. Due to the schematic nature of FIG. 2, the mounting struts, rotatable mounting brackets, and other features of the chilled beams 30 are not clearly identified. These and other presently disclosed aspects will be described in detail below with reference to FIGS. 3-13.

Figure 3:
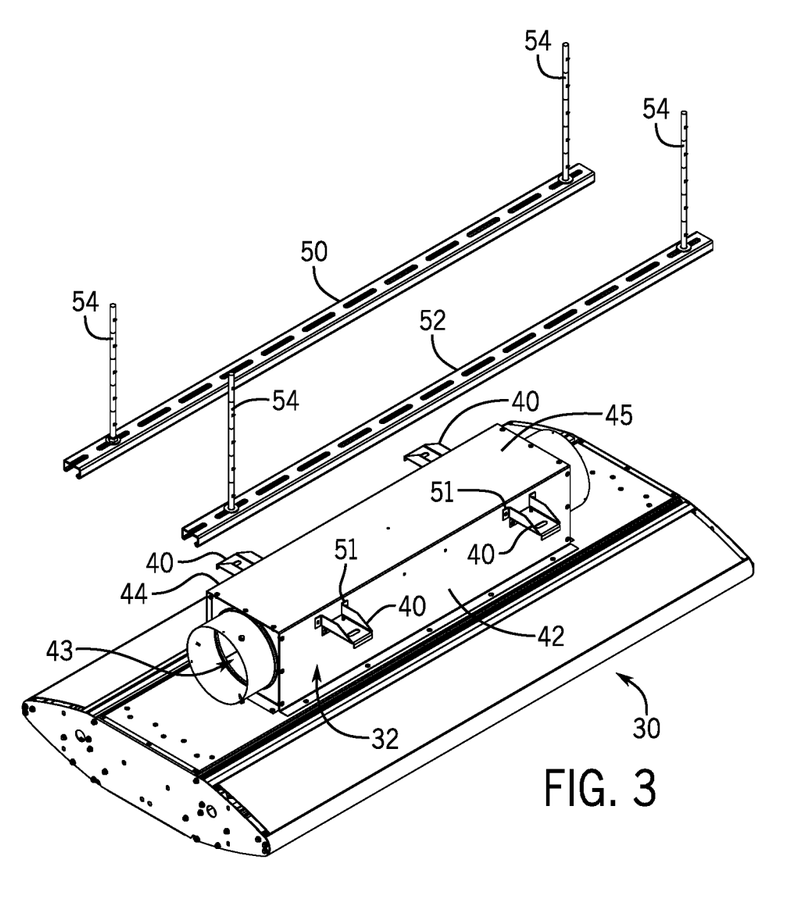
FIG. 3 is a perspective view of a chilled beam and mounting struts in an uninstalled state and for use in the HVAC system of FIG. 1, in accordance with an aspect of the present disclosure.

FIG. 3 is a perspective view of an embodiment of the chilled beam 30 and mounting struts 50, 52 for use in the HVAC system of FIG. 1. In the illustrated embodiment, the chilled beam 30 is in an uninstalled state. As shown, the chilled beam 30 includes mounting brackets 40 disposed on opposing sides 42, 44 of a body 45 of the plenum 32 of the chilled beam 30, where the body 45 includes a plenum flow path 43 formed therein. The mounting brackets 40 are illustrated in a deployed position, but can also be folded downwardly toward the body 45 of the plenum 32. For example, the mounting brackets 40 may be coupled to the body 45 of the plenum 32 via hinges. In some embodiments, the hinges may be spring-loaded. In general, the hinges may enable the mounting brackets 40 to rotate thereabout and toward the body 45 of the plenum 32. When the mounting brackets 40 are rotated upwardly into the illustrated deployed state, flanges of the mounting brackets 40 may contact the corresponding side 42 or 44 of the body 45, thereby blocking the mounting brackets 40 from over rotating. In embodiments having spring-loaded mounting brackets 40, the spring force may cause upwards rotation of the mounting brackets 40 toward the illustrated deployed state.

The mounting struts 50, 52 may be suspended from a mounting wall, for example a ceiling or a roof, via rods 54. In some embodiments, the rods 54 may be threaded, and may couple to threaded nuts disposed on or within the mounting wall. The rods 54 also engage the mounting struts 50, 52. In other words, the mounting struts 50, 52 are coupled to ends of the rods 54. As shown, the mounting struts 50, 52 are coupled to the ends of the rods 54 such that the mounting struts 50, 52 run substantially parallel to one another. In other words, the mounting struts 50, 52 may be parallel to one another within an error margin, such as +/−3 degrees. Threaded nuts may be disposed inside or underneath the mounting struts 50, 52, and the rods 54 may be screwed into the threaded nuts to retain the mounting struts 50, 52 thereon. As described in detail below with respect to later drawings, the chilled beam 30 may be raised or lifted upwardly such that the body 45 of the plenum 32 extends between the mounting struts 50, 52, enabling the mounting brackets 40 to engage the mounting struts 50, 52 for mounting the chilled beam 30 thereto. As the mounting brackets 40 contact undersides of the mounting struts 50, 52, the force of the mounting struts 50, 52 against the mounting brackets 40 may cause the mounting brackets 40 to rotate downwardly toward the opposing sides 42, 44 of the chilled beam 30. Once the chilled beam 30 is lifted a sufficient amount such that the mounting brackets 40 clear the mounting struts 50, 52, the mounting brackets 40 may rotate upwardly, or snap back, into the deployed position. The chilled beam 30 is then lowered such that the mounting brackets 40 sit, in the deployed position, on top of the mounting struts 50, 52

Figure 4:
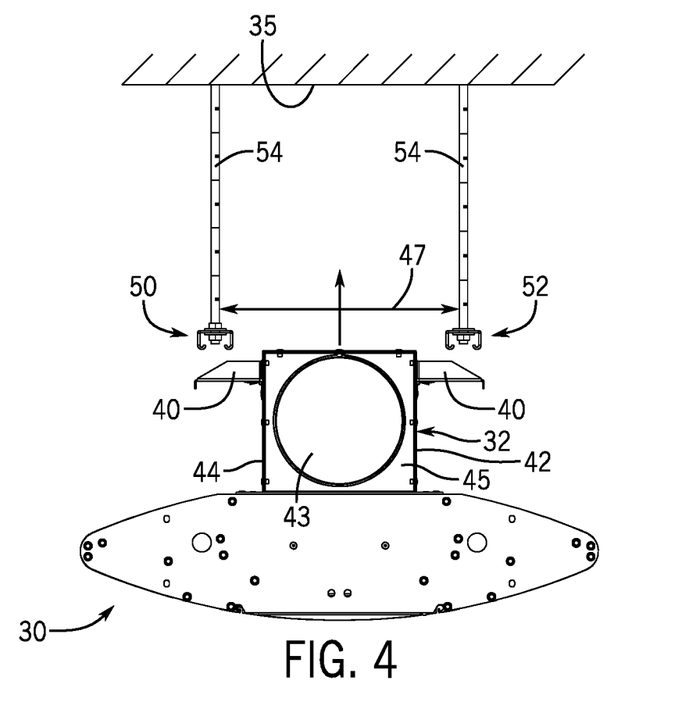
FIG. 4 is a front view of the chilled beam and the mounting struts of FIG. 3 in a phase of an installation process, in accordance with an aspect of the present disclosure.

For example, FIGS. 4, 5, 6, and 7 include front views of an embodiment of the chilled beam 30 and the mounting struts 50, 52 of FIG. 3, in various phases of an installation process. In FIG. 4, the chilled beam 30 is disposed adjacent to the mounting struts 50, 52, such that the body 45 of the plenum 32 is disposed between the mounting struts 50, 52. That is, the body 45 is aligned with a space 47 between the mounting struts 50, 52. As shown, the mounting brackets 40 on the body 45 of the plenum 32 may extend in a deployed position prior to installation. The mounting brackets 40 may be spring-loaded to resist downward rotation of the mounting brackets 40. For example, each mounting bracket 40 may include a hinge and a spring disposed about the hinge, where the hinge exerts a spring-force configured to enable the deployed position. In other words, the spring-force may resist downward rotation of the mounting bracket 40 by supporting a weight of the mounting bracket 40.

Figure 5:
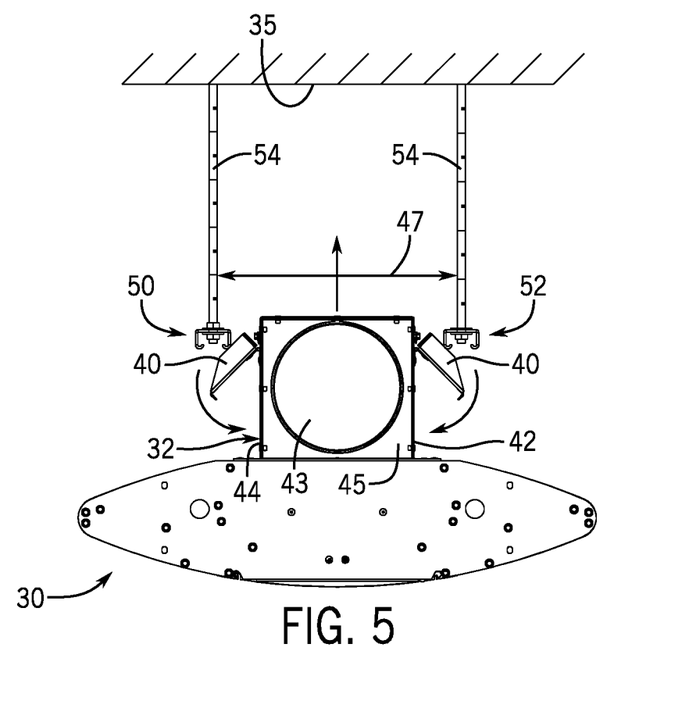
FIG. 5 is another front view of the chilled beam and the mounting struts of FIG. 3 in another phase of an installation process, in accordance with an aspect of the present disclosure.

In FIG. 5, the chilled beam 30 is lifted upwardly toward the space 47 between the mounting struts 50, 52, such that the mounting struts 50, 52 contact the mounting brackets 40 disposed on the opposing sides 42, 44 of the body 45 of the plenum 32. The downward force of the mounting struts 50, 52 against the mounting brackets 40 may overcome the spring-force described above with respect to FIG. 4, causing the mounting brackets 40 to rotate in a circumferential direction toward or to the sides 42, 44 of the body 45, in a retracted position. In some embodiments, a cross-bracket (not shown) may extend between, and couple to, the mounting struts 50, 52 to stabilize a distance of the space 47 between the mounting struts 50, 52. That is, the cross-bracket (not shown) may be installed across the mounting struts 50, 52 prior to lifting the chilled beam 30 between the space 47 between the mounting struts 50, 52, such that the cross-bracket (not shown) stabilizes the space 47 as the mounting brackets 40 contact the mounting struts 50, 52.

Figure 6:
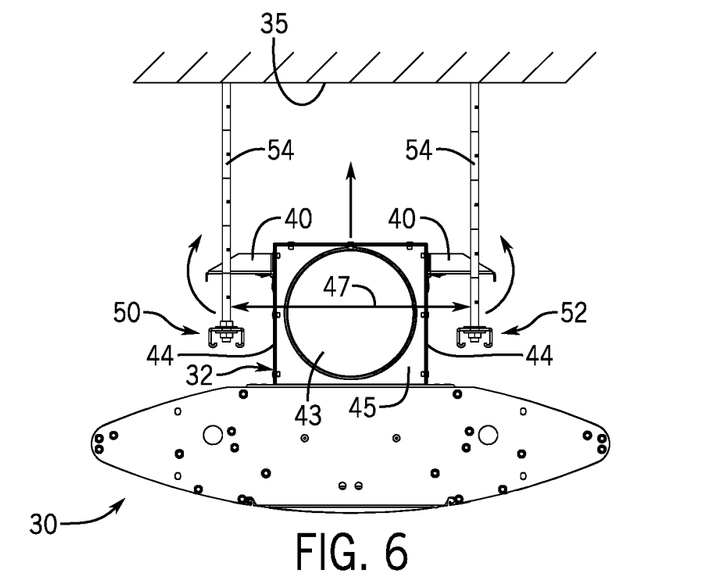
FIG. 6 is another front view of the chilled beam and the mounting struts of FIG. 3 in another phase of an installation process, in accordance with an aspect of the present disclosure.
Figure 7:
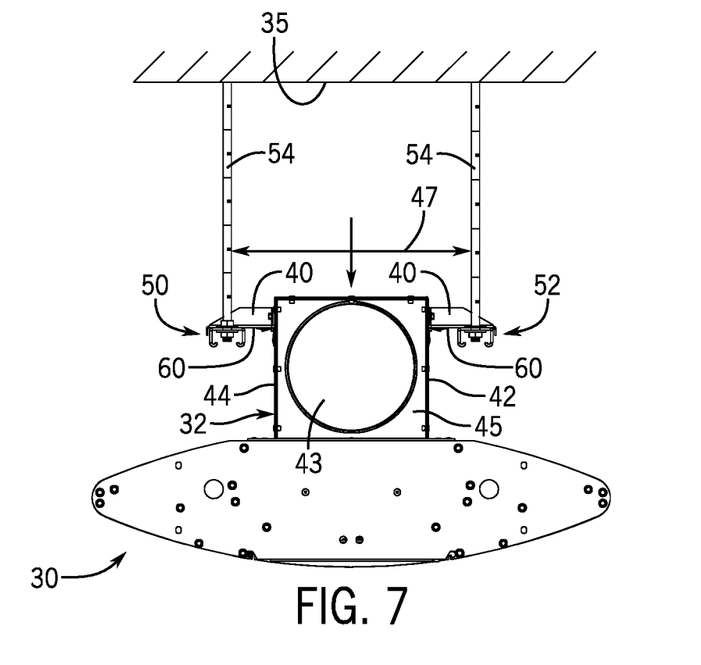
FIG. 7 is another front view of the chilled beam and the mounting struts of FIG. 3 in another phase of an installation process, in accordance with an aspect of the present disclosure.

The retracted position of the mounting brackets 40 enables the body 45 of the plenum 32 to pass into the space 47 between the mounting struts 50, 52, as illustrated in FIG. 6. After the mounting brackets 40 clear the mounting struts 50, 52 while the chilled beam 30 is lifted upwardly, the mounting brackets 40 may snap outwardly into the aforementioned deployed position. For example, without the downward force of the mounting struts 50, 52 against the mounting brackets 40, the aforementioned spring force may cause the mounting brackets 40 to move into the aforementioned deployed position. That is, the deployed position may correspond to a resting position of the mounting brackets 40. As illustrated in FIG. 7, the chilled beam 30 may then be lowered such that mounting surfaces 60 of the mounting brackets 40 contact, or sit on, the mounting struts 50, 52. As shown, the mounting surfaces 60 of the mounting brackets 40 may extend parallel to each other, and/or may be disposed in-plane, such that the chilled beam 30 is level when the mounting brackets 40 are lowered onto the mounting struts 50, 52. In FIG. 7, the chilled beam 30 is disposed in a mounted state.

Figure 8:
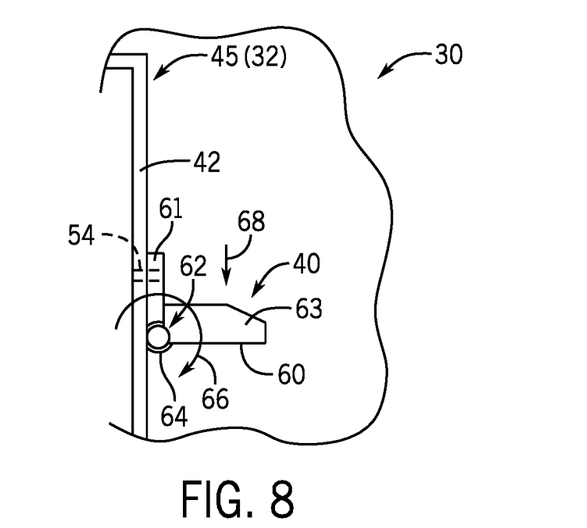
FIG. 8 is a cross-sectional, schematic side view of a portion of the chilled beam of FIG. 3, including a mounting bracket coupled to a side of the chilled beam, in accordance with an aspect of the present disclosure.

FIG. 8 is a cross-sectional, schematic side view of an embodiment of a portion of the chilled beam 30 of FIG. 3, namely, one of the mounting brackets 40 coupled to the side 42 of the body 45 of the plenum 32 of the chilled beam 30. FIG. 8 and the description below references one embodiment suitable for enabling the above-described rotation of the mounting brackets 40 during the installation process illustrated in FIGS. 4-7, although other techniques are also possible. In the illustrated embodiment, the mounting bracket 40 includes a mounting part 61 mounted to the side 42 of the body 45 of the plenum 32 of the chilled beam 30. The mounting part 61 may be coupled to the side 42 of the body 45 via a bolt 59. The mounting bracket 40 also includes a rotatable part 63 coupled to the mounting part 61 via a hinge 62. The hinge 62 may enable rotation of the rotatable part 63 of the mounting bracket 40 in a circumferential direction 66. A spring 64 disposed on the mounting bracket 40, for example disposed around the hinge 62, may enable a spring force that supports at least a weight of the mounting bracket 40. That is, the spring 64 may cause the mounting bracket 40 to rest in the illustrated deployed position, such that the mounting surface 60 of the mounting bracket 40 is flat for resting on a mounting strut (not shown). As described above, the chilled beam 30 may be lifted such that a downward force 68 against the mounting bracket 40 causes the rotatable part 63 of the mounting bracket 40 to rotate in the circumferential direction 66, toward the illustrated side 42, enabling the body 45 of the chilled beam 30 to pass into a space between two mounting struts. After clearing the mounting struts, the rotatable part 63 may snap into the deployed position, and the chilled beam 30 may then be lowered such that mounting surface 60 of the mounting bracket 40 sits or rests on the mounting strut. A flange (not shown) of the mounting bracket 40 may contact the side 42 of the body 45 to block the mounting bracket 40 from over rotating the illustrated deployed position.

Figure 9:
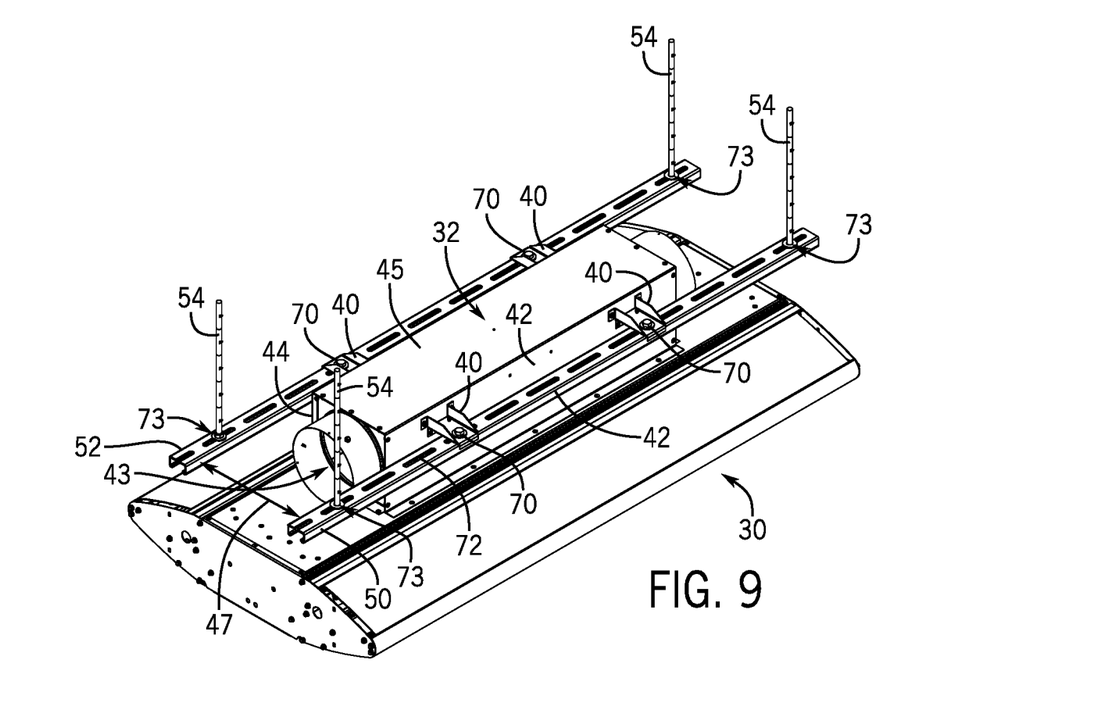
FIG. 9 is a perspective view of the chilled beam and the mounting struts of FIG. 3 in an installed state, in accordance with an aspect of the present disclosure.

FIG. 9 is a perspective view of the chilled beam 30 and the mounting struts 50, 52 of FIG. 3, following the mounting process illustrated in FIGS. 4-7. In the illustrated embodiment, the chilled beam 30 is disposed upon the mounting struts 50, 52 in the above-described mounted state. The chilled beam 30 includes four of the mounting brackets 40 coupled to the body 45 of the plenum 32, and each mounting bracket 40 sits on one of the mounting struts 50, 52 suspended by the rods 54. The rods 54 may suspend the mounting struts 50, 52 by extending into slots 72 of the mounting struts 50, 52 and coupling to, for example, threaded nuts 73 disposed within the mounting struts 50, 52. The threaded nuts 73 may also include external nuts or washers disposed outside of a cavity of the mounting struts 50, 52, as shown. That is, one threaded nut 73 may be disposed within a cavity of the mounting strut 50 or 52, and one threaded nut 73 may be disposed external to the cavity of the mounting strut 50 or 52, where the internal and external threaded nuts 73 receive one of the threaded rods 54. Further, fasteners 70 are disposed through the mounting brackets 40 and into the slots 72 of the mounting struts 50, 52. The fasteners 70 may include, for example, a bolt and a series of nuts configured to couple the mounting brackets 40 to the mounting struts 50, 52. These features may block the chilled beam 30 from sliding along the mounting struts 50, 52, and/or from side to side.

Figure 10:
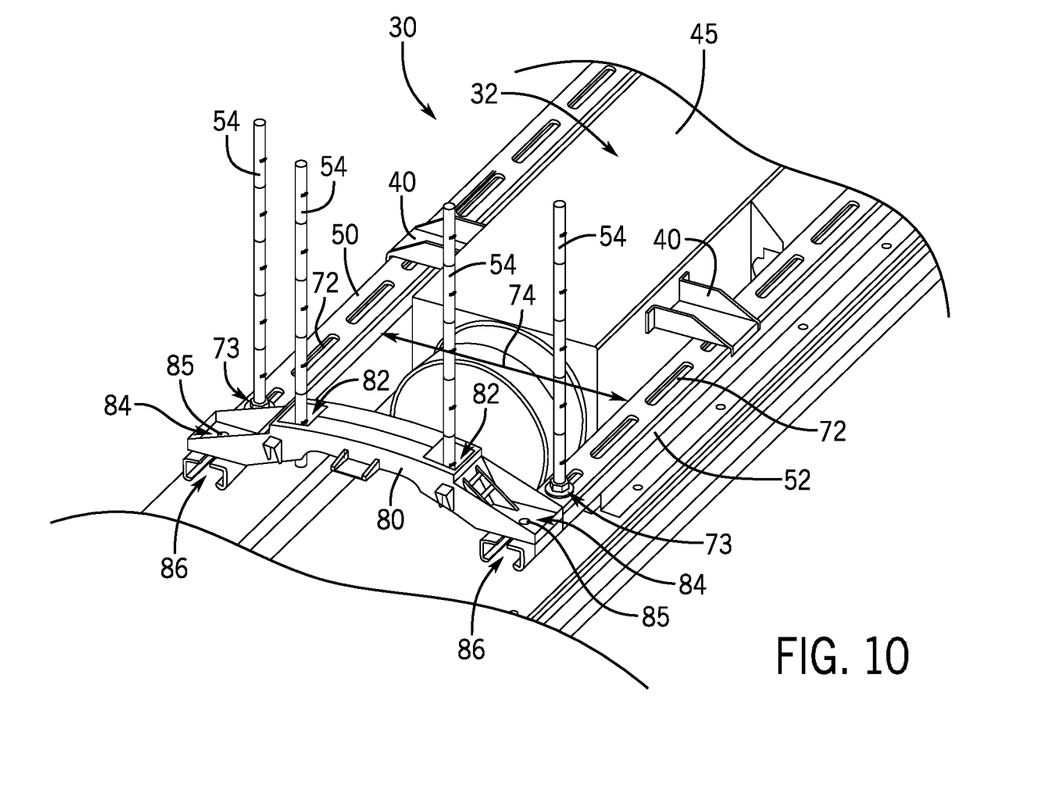
FIG. 10 is a perspective view of a portion of a chilled beam and mounting struts for use in the HVAC system of FIG. 1, in accordance with an aspect of the present disclosure.

Additional features may be used to stabilize components of the installation system. For example, FIG. 10 is a perspective view of an embodiment of a portion of the chilled beam 30 and the mounting struts 50, 52, for use in the HVAC system of FIG. 1. In the illustrated embodiment, a cross-bracket 80 extends between the mounting struts 50, 52. The cross-bracket 80 includes openings 82 through which certain of the threaded rods 54 extend. The cross-bracket 80 also includes openings 84 through which fasteners 85 extend, and the fasteners 85 may couple to features, for example nuts, disposed within a cavity 86 of the corresponding mounting strut 50, 52. The cross-bracket 80 may be installed prior to lifting the chilled beam 30 into mounting engagement with the mounting struts 50, 52. Thus, as the mounting brackets 40 coupled to the chilled beam 30 contact the mounting struts 50, 52 during the installation process, the cross-bracket 80 may maintain a distance of the space 74 between the mounting struts 50, 52. Further, the cross-bracket 80 may stabilize the mounting struts 50, 52 such that the mounting struts 50, 52 can exert a sufficient force against the mounting brackets 40 to rotate the mounting brackets 40 from the deployed position toward or to the retracted position, as the chilled beam 30 is lifted into the space 74. In some embodiments, the mounting struts 50, 52 may not include the illustrated cavity, and may instead include a flat plate with the illustrated slots 72 or other openings configured to enable coupling of the threaded rods 54, the cross-bracket 80, the mounting brackets 40, or any combination thereof to the mounting struts 50, 52. In some embodiments, a groove may be disposed in the mounting struts 50, 52, and the mounting brackets 40 may fit within the grooves, such that the mounting brackets 40 are blocked from sliding along the mounting struts 50, 52. In such an embodiment, fasteners may not be needed to block the mounting brackets 40 from sliding along the mounting struts 50, 52.

Figure 11:
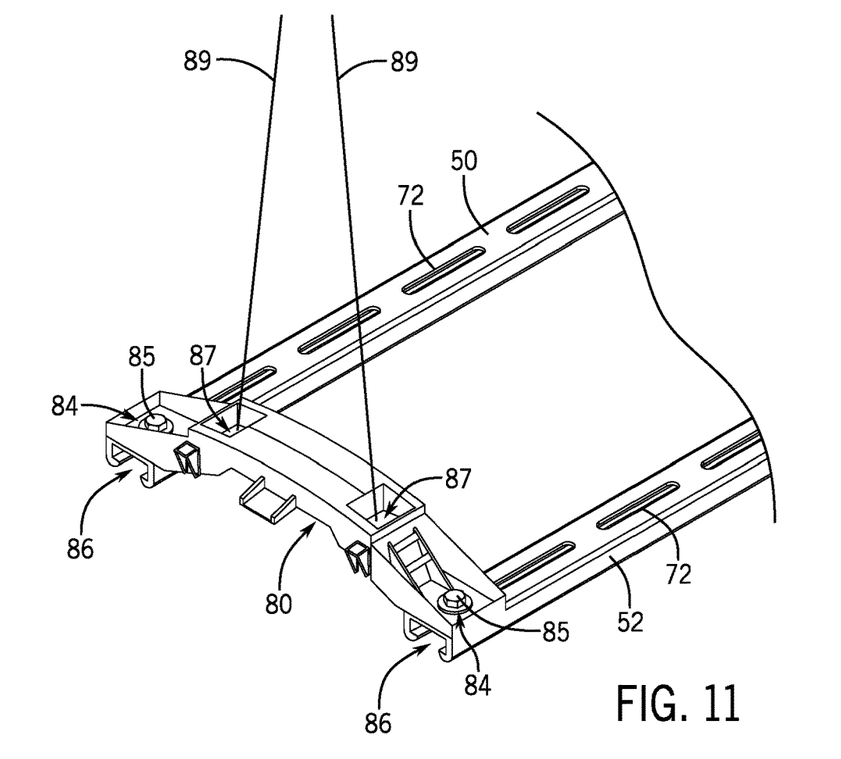
FIG. 11 is a perspective view of a portion of a mounting system on which a chilled beam can be mounted, for use in the HVAC system of FIG. 1, in accordance with an aspect of the present disclosure.

Other mounting features are also contemplated by the present disclosure. For example, FIG. 11 is a perspective view of an embodiment of a portion of a mounting system on which a chilled beam can be mounted, for use in the HVAC system of FIG. 1. In the illustrated embodiment, the cross-bracket is coupled to the mounting struts 50, 52 via fasteners 85. For example, as previously described, the fasteners 85 may extend through openings 84 in the cross-bracket 80 and into slots 72 of the mounting struts 50, 52. The fasteners 85 may couple to, for example, anchors disposed in cavities 86 of the mounting struts 50, 52. The anchors may include, for example, threaded nuts configured to receive the fasteners 85. As shown, the cross-bracket 80 may be suspended from a ceiling via suspension wires 89. That is, the cross-bracket 80, which may be referred to as a hangar bracket, may be designed to accept architectural wire suspension. Anchors 87 may be mounted to, or integral with, the cross-bracket 80, where the suspension wires 89 extend from the anchors 87 and to the ceiling. In certain embodiments not having the cross-bracket 80, suspension wires may be directly coupled to the mounting struts 50, 52.

Figure 12:
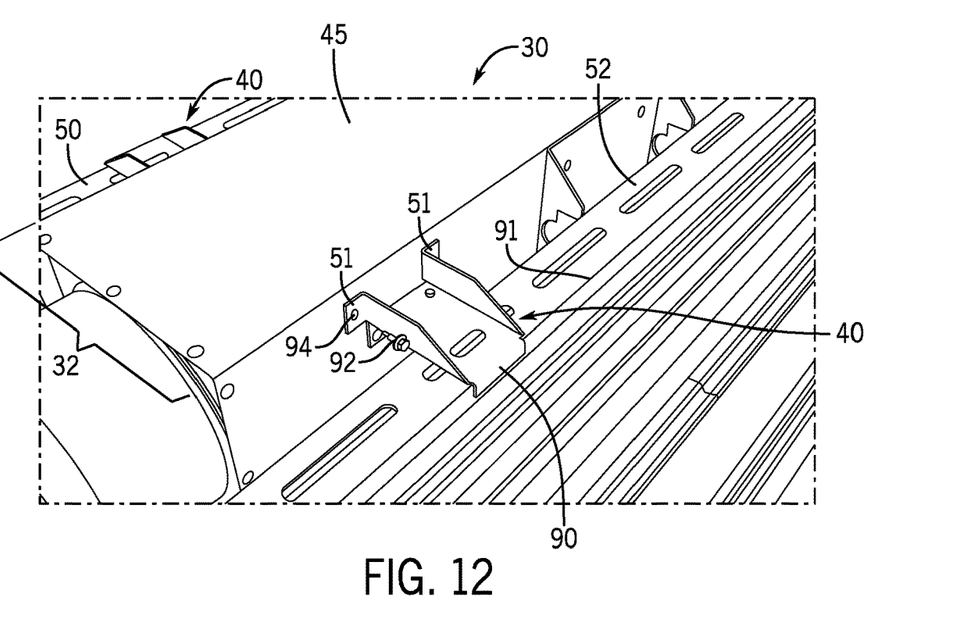
FIG. 12 is a perspective view of a portion of a chilled beam and mounting struts for use in the HVAC system of FIG. 1, in accordance with an aspect of the present disclosure.

FIG. 12 is a perspective view of an embodiment of a portion of the chilled beam 30 and the mounting struts 50, 52 for use in the HVAC system of FIG. 1. In the illustrated embodiment, the chilled beam 30 is mounted to the mounting struts 50, 52. That is, the mounting brackets 40 are in the deployed position and sit upon the mounting struts 50, 52. In the illustrated embodiment, the mounting bracket 40 includes a lip 90 that extends over an edge 91 of the mounting strut 52. The lip 90 may help guide the mounting bracket 40 into place on the mounting strut 52. Further, as previously described, the mounting bracket 40 includes the illustrated flanges 51, which may block over rotation of the mounting bracket 40. In the illustrated embodiment, a fastener 92, such as a bolt, a screw, a pin, or other fastener, may extend through an opening 94 in one of the flanges 51. In some embodiments, both flanges 51 of the mounting bracket 40 may receive a fastener 92. The fastener 92 may further stabilize the mounting bracket 40 after the chilled beam 30 is installed or mounted onto the mounting struts 50, 52. The fastener 92 may be referred to as a post-mount fastener, because it is installed after the chilled beam 30 is mounted on the mounting struts 50, 52, in order to further stabilize the chilled beam 30.

Figure 13:
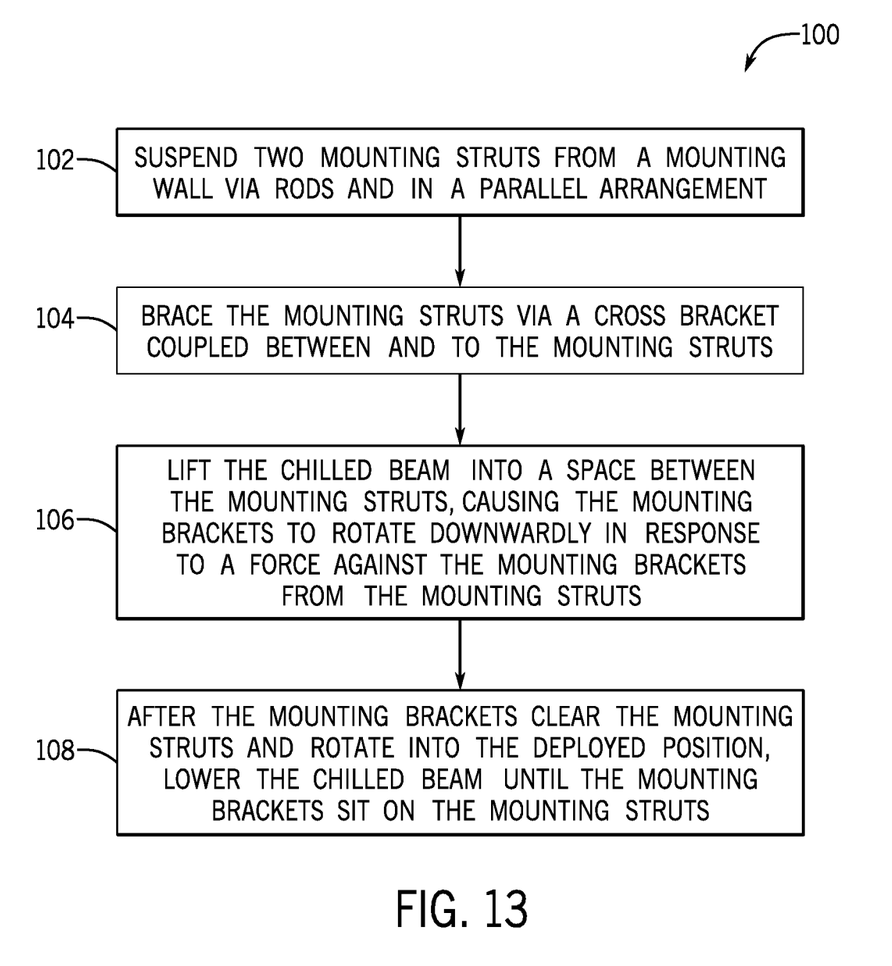
FIG. 13 is a process flow diagram illustrating a method of installing a chilled beam in the HVAC system of FIG. 1, in accordance with an aspect of the present disclosure.

FIG. 13 is a process flow diagram illustrating an embodiment of a method 100 of installing a chilled beam in the HVAC system of FIG. 1. In the illustrated embodiment, the method 100 includes suspending (block 102) two mounting struts from a mounting wall via rods and in a parallel arrangement. For example, as previously described, threaded rods may be coupled to the mounting wall and suspended therefrom. The mounting struts may be coupled to distal ends of the threaded rods, such that the mounting struts are suspended parallel to one another.

The method 100 also includes bracing (block 104) the mounting struts via a cross-bracket coupled between the mounting struts. For example, the cross-bracket may be coupled to both of the mounting struts and may extend therebetween. The cross-bracket may stabilize, or maintain, a distance between the mounting struts, and may stabilize the mounting struts against a force exerted thereon by mounting brackets of the chilled beam.

The method 100 also includes lifting (block 106) the chilled beam into the space between the mounting struts, causing the mounting brackets to rotate downwardly in response to a force against the mounting brackets from the mounting struts. For example, as previously described, the mounting brackets may normally extend in a deployed position, in some embodiments via the assistance of a spring-force. As the mounting struts contact the mounting brackets, the mounting struts may force the mounting brackets to rotate to, or toward, a retracted position, which enables the chilled beam, or plenum body thereof, to extend into the space between the mounting struts.

The method 100 also includes, after the mounting brackets clear the mounting struts and rotate back to the deployed position, lowering (block 108) the chilled beam until the mounting brackets sit on the mounting struts. For example, after the mounting brackets snap into the deployed position, a distance from tip-to-tip of the mounting brackets may be greater than the space between the mounting struts. Thus, the chilled beam may be lowered such that the mounting brackets of the chilled beam sit on top of the mounting struts. In some embodiments, fasteners may be used to couple the mounting brackets to the mounting struts, and/or to rigidly couple the mounting brackets to the side of the chilled beam, such as the plenum body of the chilled beam.

The presently disclosed chilled beam installation system and technique enables reduced installation cost and improves installation safety. For example, instead of requiring traditional cumbersome installation techniques while the chilled beam is lifted into place, presently disclosed systems and installation techniques include mere lifting and lowering of the chilled beam relative to mounting struts in order to suspend the chilled beam in place adjacent, for example, a ceiling or other mounting wall. After the chilled beam is mounted on the mounting struts, additional coupling techniques may be included while the mounting struts support the weight of the chilled beam.

While only certain features and embodiments of the disclosure have been illustrated and described, many modifications and changes may occur to those skilled in the art, such as variations in sizes, dimensions, structures, shapes and proportions of the various elements, values of parameters including temperatures and pressures, mounting arrangements, use of materials, colors, orientations, etc., without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described, such as those unrelated to the presently contemplated best mode of carrying out the disclosure, or those unrelated to enabling the claimed disclosure. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A chilled beam, comprising:
 a body of the chilled beam including a first side and a second side opposite to the first side;
 a first mounting bracket having a first mounting part coupled to the first side and having a first rotatable part configured to rotate relative to the first mounting part and against a first bias of the first mounting bracket in response to a first force against the first rotatable part of the first mounting bracket;
 a second mounting bracket having a second mounting part coupled to the second side and having a second rotatable part configured to rotate relative to the second mounting part and against a second bias of the second mounting bracket in response to a second force against the second rotatable part of the second mounting bracket;
 a first post-mount fastener configured to extend through the first rotatable part of the first mounting bracket and into the first side of the body of the chilled beam after the chilled beam is in a mounted state; and
 a second post-mount fastener configured to extend through the second rotatable part of the second mounting bracket and into the second side of the body after the chilled beam is in a mounted state.

2. The chilled beam of claim 1, wherein the first rotatable part of the first mounting bracket is configured to rotate relative to the first mounting part and against the first bias in a first circumferential direction between a first deployed position and a first retracted position in response to the first force, and wherein the second rotatable part of the second mounting bracket is configured to rotate relative to the second mounting part against the second bias in a second circumferential direction between a second deployed position and a second retracted position in response to the second force.

3. The chilled beam of claim 2, wherein the first circumferential direction is opposite to the second circumferential direction.

4. The chilled beam of claim 1, wherein the first rotatable part of the first mounting bracket includes a first flange that is configured to contact the first side of the body of the chilled beam to resist a first upward force exerted by a first strut on which the chilled beam is configured to be mounted, and wherein the second rotatable part of the second mounting bracket includes a second flange that is configured to contact the second side of the body of the chilled beam to resist a second upward force exerted by a second strut on which the chilled beam is configured to be mounted.

5. The chilled beam of claim 1, wherein the first mounting bracket comprises a hinge configured to support a weight of the first rotatable part of the first mounting bracket via the first bias, and to enable the first mounting bracket to rotate in a first circumferential direction in response to the first force.

6. The chilled beam of claim 5, wherein the hinge comprises a spring including a spring force configured to exert the first bias.

7. The chilled beam of claim 1, wherein the body comprises a plenum body in which a plenum flow path is disposed, and wherein the first mounting bracket and the second mounting bracket are coupled to the plenum body.

8. The chilled beam of claim 1, comprising:
a third mounting bracket having a third mounting part coupled to the first side of the body and having a third rotatable part configured to rotate relative to the third mounting part and against a third bias of the third mounting bracket in response to a third force against the third rotatable part of the third mounting bracket; and
a fourth mounting bracket having a fourth mounting part coupled to the second side of the body and having a fourth rotatable part configured to rotate relative to the fourth mounting part and against a fourth bias of the fourth mounting bracket in response to a fourth force against the fourth rotatable part of the fourth mounting bracket.

9. The chilled beam of claim 1, wherein the chilled beam comprises water coils configured to receive cooled or heated water.

10. A heating, ventilation, and/or air conditioning (HVAC) system, comprising:
a first mounting strut;
a second mounting strut;
a chilled beam including a first rotatable mounting bracket disposed on a first side of the chilled beam and configured to sit on the first mounting strut in a deployed position, and a second rotatable mounting bracket disposed on a second side of the chilled beam opposite to the first side and configured to sit on the second mounting strut in the deployed position, wherein each of the first and second rotatable mounting brackets is biased to the deployed position;
a cross-bracket configured to engage the first mounting strut and the second mounting strut to stabilize a distance between the first mounting strut and the second mounting strut;
suspension wires coupled to the cross-bracket and configured to be coupled to a mounting wall;
a first post-mount fastener configured to extend through a first rotatable part of the first rotatable mounting bracket and into the first side of the chilled beam with the first rotatable mounting bracket in the deployed position; and
a second post-mount fastener configured to extend through a second rotatable part of the second rotatable mounting bracket and into the second side of the chilled beam with the second rotatable mounting bracket in the deployed position.

11. The HVAC system of claim 10, comprising:
a first hinge of the first mounting bracket, wherein the first hinge is configured to enable rotation of the first rotatable mounting bracket between the deployed position and a retracted position, in response to a first downward force on the first mounting bracket by the first mounting strut;
and a second hinge of the second mounting bracket, wherein the second hinge is configured to enable rotation of the second rotatable mounting bracket between the deployed position and the retracted position, in response to a second downward force on the second mounting bracket by the second mounting strut.

12. The HVAC system of claim 10, comprising:
a first spring configured to exert a first spring-force to bias the first mounting bracket toward the deployed position and away from a retracted position; and
a second spring configured to exert a second spring-force to bias the second mounting bracket toward the deployed position and away from the retracted position.

13. The HVAC system of claim 10, wherein the first mounting bracket comprises a first flange configured to contact the first side of the chilled beam to prevent rotation of the first mounting bracket beyond the deployed position, and wherein the second mounting bracket comprises a second flange configured to contact the second side of the chilled beam to prevent rotation of the second mounting bracket beyond the deployed position.

14. The chilled beam installation assembly of claim 10, wherein the chilled beam comprises a plenum having a plenum flow path defined within a plenum body, wherein the first mounting bracket is mounted to the plenum body on the first side of the chilled beam, and wherein the second mounting bracket is mounted to the plenum body on the second side of the chilled beam.

15. A chilled beam installation assembly, comprising:
a mounting strut;
a rotatable mounting bracket coupled to a chilled beam side wall and having a hinge configured to enable rotation of the rotatable mounting bracket relative to the chilled beam side wall between a retracted position in which the rotatable mounting bracket is not configured to sit on the mounting strut and a deployed position in which the rotatable mounting bracket is configured to sit on the mounting strut;
a fastener extending through the rotatable mounting bracket and into the mounting strut such that, in an installed configuration, the mounting bracket is coupled to the mounting strut; and
a post-mount fastener configured to extend through a rotatable part of the rotatable mounting bracket and into the chilled beam side wall with the rotatable mounting bracket in the deployed position.

16. The chilled beam installation assembly of claim 15, comprising:
an additional mounting strut; and
an additional rotatable mounting bracket coupled to an additional chilled beam side wall and having an additional hinge configured to enable rotation of the additional rotatable mounting bracket relative to the additional chilled beam side wall between the retracted position and the deployed position.

17. The chilled beam installation assembly of claim 16, comprising a plurality of rods configured to suspend the mounting strut and the additional mounting strut from a mounting wall such that the mounting strut and the additional mounting strut extend parallel to each other.

18. The chilled beam installation assembly of claim 16, comprising a cross-bracket configured to engage the mounting strut and the additional mounting strut to stabilize a distance between the mounting strut and the additional mounting strut.

19. The chilled beam installation assembly of claim 16, wherein the chilled beam side wall and the additional chilled beam side wall define a plenum box having a plenum flow path therein.

20. The chilled beam installation assembly of claim 15, wherein the rotatable mounting bracket is spring-loaded such that a spring force causes the deployed position and resists the retracted position.

21. The chilled beam installation assembly of claim 20, comprising a spring disposed about the hinge of the rotatable mounting bracket, wherein the rotatable mounting bracket is spring-loaded via the spring.

22. The chilled beam installation assembly of claim 20, wherein the rotatable mounting bracket comprises a flange configured to contact the chilled beam side wall to resist the spring force while the rotatable mounting bracket is in the deployed position.

* * * * *